UNITED STATES PATENT OFFICE.

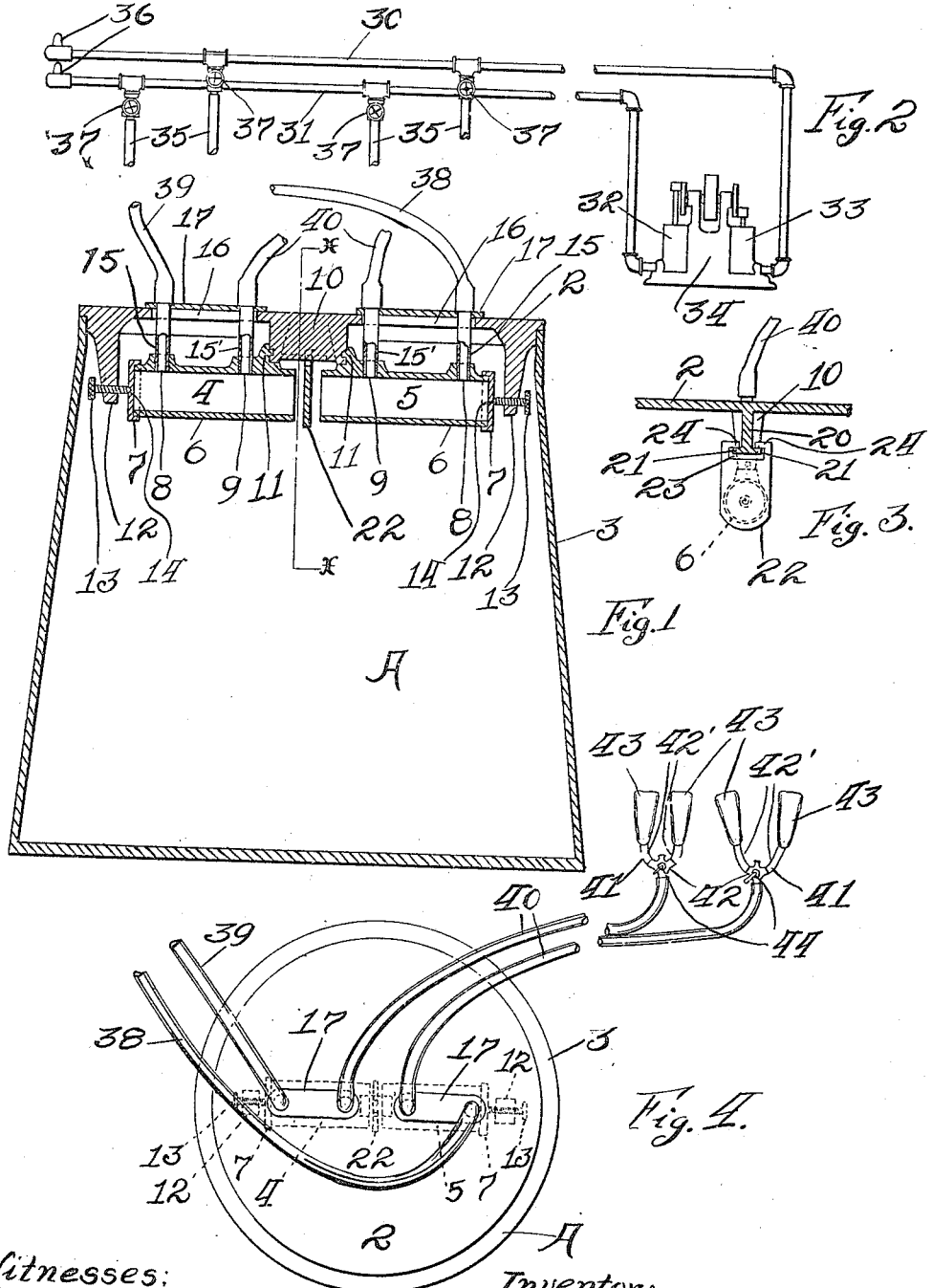

GEORGE SINCLAIR, OF ST. PAUL, MINNESOTA, ASSIGNOR TO FREDERICK G. BRADBURY, OF ST. PAUL, MINNESOTA.

MILKING APPARATUS.

1,139,590.

Specification of Letters Patent.

Patented May 18, 1915.

Application filed November 12, 1914. Serial No. 871,711.

*To all whom it may concern:*

Be it known that I, GEORGE SINCLAIR, a citizen of the United States, residing at St. Paul, in the county of Ramsey and State of Minnesota, have invented a new and useful Improvement in Milking Apparatus, of which the following is a specification.

This invention relates to improvements in milking apparatus.

It has for its primary object the production of simple and inexpensive construction, wherein the parts with which the milk comes into contact can more easily be cleaned and kept cleaner than in devices which have heretofore been employed.

The invention provides also a double milking device and an air pipe system in which a pulsating action is produced for exhausting air alternately in a pair or pairs of milking tubes.

In the accompanying drawing forming part of this specification, Figure 1 is a vertical section of part of my invention; Fig. 2 is a diagram of the air pipe system; Fig. 3 is a section of a detail taken on the line X—X of Fig. 1, and Fig. 4 is a plan of the construction illustrated in Fig. 1, showing the milking tubes with their teat cups attached.

In the drawing A indicates a main milk receptacle, such as a pail, which in use is placed on the ground or floor alongside of the cow to be milked. This pail is provided with a cover 2, which is placed over its body 3, and has mounted therein a pair of oppositely disposed valved milk containers 4 and 5. These milk containers are similar in construction, each consisting of a horizontal tube 6, having a cap 7 placed over one end and formed with a pair of ports 8 and 9 in one side. The central portion of the cover 2 is provided with a depending boss 10, into the sides of which a pair of protuberances 11 engage, said protuberances being formed on the sides of the containers 4 and 5, so that when engaged with the support 10, the open ends of the containers 4 and 5 face together and are spaced a short distance apart, leaving the other ends of the containers 4 and 5, which are closed by caps 7 distanced wide apart. The cover 2 is also formed with a pair of depending arms 12, through which threaded supporting screws 13 are fastened, said screws being formed with pointed ends, which are adapted to engage in centrally disposed recesses 14 in the caps 7 to hold the tubes on the support 10 with the caps 7 tightly closed over their outer ends. The ports 8 and 9 have secured therein upwardly projecting nipples 15, which extend through a slot 16 in the cover immediately above each of the containers 4 and 5. A plate 17 is placed over each pair of nipples 15, and closes the slot 16 in the cover and flexible tubes such as 38 to 40 are attached over the ends of the nipples 15 and 15' and hold the plates 17 tightly over the slots 16. The support 10 is formed with a track bar 20 extending longitudinally of the pair of containers 4 and 5, said bar having a pair of longitudinal projections 21 along its lower edge for the greater portion of its length. Hung upon these projections 21 is a valve 22 in the form of a flat thin plate having a keyway 23, fitted freely with its inturned shoulders 24 engaging over the supporting projections 21. By this construction the valve 22 is free to slide and oscillate in the interval between the open ends of the milk containers 4 and 5, first closing one of the milk containers and then the other, so as to form an air tight connection between the ports of each valved milk chamber.

The air pipe system for operating the milking devices, consists of a pair of substantially parallel pipes 30 and 31 extending through the building or shed in which the milking apparatus is installed, one pipe being connected to one cylinder 32, and the other to the cylinder 33 of an air exhaust pump of any suitable kind, such as 34, which is adapted to be operated by any prime mover when desired, such as a gas engine, windmill, electric motor or other power producer not illustrated.

The mode of connecting the pipes to the air exhaust machine is such that air is exhausted successively from first one pipe and then the other, the successive impulses being adapted for use with the double milk containers described. As many sets of branches 35 are connected with the main air exhaust pipes as desired, the apparatus permitting the milking of any number of cows. The main exhaust pipes are provided with air regulating valves 36 of usual construction through the use of which the strength of the exhaust in the pipes can be regulated for milking cows where greater or less strength of exhaust is desired. The branch pipes 35 may be closed or opened by the use of valves 37. One of the main air exhaust pipes 30 is connected by a flexible tube 38, one end of which is attached to a branch 35 and its other end to one of the nipples 15 leading to one of the milk containers such as 5, while the other main pipe 31 is connected by a flexible tube 39 to the nipple 15, leading to the other milk container 4. While the tubes 38 and 39 are not shown in the drawing connected to the branches 35, it will be understood that this is done by simply inserting a branch of one of the pipes 30 into one of the tubes as 38 and a branch of the other pipe 31 into the remaining tube 39. The remaining nipples 15' are connected by flexible tubes 40 to hand devices 41. Each of these hand devices consists of a passaged body 42 having a pair of branch ducts 42' to which the teat cups 43 are connected. At the junction of the branches with the body 42 a vent cock 44 is inserted, by the use of which the strength of the suction produced by drawing air through the connected milking tube can be regulated. By opening the cock 44 fully the teat cups can be readily released from their connection with the teats.

In use the pulsation of air produced by the air exhaust device through the main pipes are conducted through the tubes 38 and 39, milk containers 4 and 5, and milking tubes 40, thereby drawing or tending to draw air through first one set of teat cups and then the other approximating the natural manner of milking. The milk flowing through the milk conducting tubes 40 is held in each container until a pulsation is completed, the valve 22 in the meantime holding one container closed, and opening the opposite one. While either container is open, milk flows therefrom into the main receptacle A. When it is desired to clean those portions of the apparatus with which the milk comes into contact, the retainers can be removed by loosening the screws 13 and detaching all of the tubes therefrom. The valve 22 can also be detached from its support by passing it over the ends of the supporting projections 21. An apparatus of this character is less liable to get out of order than devices wherein separate pumping mechanism is employed for each milking device, and the construction is simpler and less expensive.

In accordance with the patent statutes, I have described the principles of operation of my invention together with the apparatus which I now consider to represent the best embodiment thereof, but I desire to have it understood that the construction shown is only illustrative, and that the invention can be carried out by other means and applied to uses other than those above set forth within the scope of the following claims.

Having described my invention, what I claim as new and desire to protect by Letters Patent is:—

1. Apparatus of the class set forth, comprising, in combination, a main milk receptacle, a pair of milk containers mounted upon said receptacle, comprising a pair of tubes arranged endwise and having a pair of their ends facing together and spaced slightly apart, a valve hung freely in the interval between said tubes, said tubes being formed with ingress ports for air and milk and with egress ports for air, teat cups connected with said ingress ports and means for exhausting air through said egress ports, said valve being free to move and alternately close the adjacent ends of said tubes to the ingress of air whereby during the open positioning of said valve, the contents of the open container are released into said main receptacle.

2. In apparatus of the class set forth, a main milk receptacle, a cover over said receptacle having a pair of depending supports, a milk container in the form of a tube having a protuberance adapted to engage one of said supports and a pair of ingress and egress ports respectively for milk and air, a cap over one end of said tube, a thumb screw passing through the other of said supports and engaging said cover to hold it closed with said tube supported upon said cover, a milking duct connected with said ingress port, an air exhaust duct connected with said egress port and a valve freely hung in front of the open end of said tube and adapted through the exhaust of air from said milk container to close the open end of said tube.

3. In an apparatus of the class set forth, an air pipe system for milking apparatus, comprising, a pair of trunk pipes, means for alternately exhausting air from first one and then the other of said pipes and a plurality of branches connected with said pipes, each pair of said branches leading from both of said trunk pipes and adapted for connection with a milking device, whereby air is exhausted in a series of pulsations from said device by said trunk pipes.

4. In apparatus of the class set forth, a closed receptacle having spaced nipples opening thereinto, a milk container supported within said receptacle and having an open and a closed end, a milk ingress port and an air egress port, said egress port being connected with one of said nipples, a valve freely hung adjacent the open end of said container and between said nipples, and means for causing suction first through one of said nipples upon one face of said valve and then through the other of said nipples upon another face of said valve to alternately move said valve into closed and open positions with respect to the adjacent end of said container.

5. In apparatus of the class set forth, a closed receptacle, a pair of milk containers removably supported within said receptacle and having adjacent open ends, a valve having pivotal and sliding movement hung between said open ends, each of said containers having an egress port, and means for creating an exhaust first through one and then the other of said egress ports to alternately move said valve into closed positions with respect to the adjacent ends of said containers.

6. In apparatus of the class set forth, a pair of milk containers having adjacent open ends, a valve mounted for pivotal sliding movement between said open ends, each of said containers having a milk ingress and an air egress port, and means for creating an exhaust first through one and then the other of said egress ports to alternately move said valve into closed positions with respect to the adjacent ends of said containers.

7. In apparatus of the class set forth, a milk container having an open end and an air egress port, a flat valve mounted for pivotal sliding movement adjacent the open end of said container, and means for alternately causing suction first upon one face of said valve through said container and egress port and then upon the opposite face of said valve to move said valve into closed and open positions with respect to the adjacent end of said container.

In testimony whereof, I have signed my name to this specification, in the presence of two subscribing witnesses.

GEORGE SINCLAIR

Witnesses:
STELLA L. WASCHENBERGER.
F. G. BRADBURY.